United States Patent [19]

Alan

[11] Patent Number: 4,905,541
[45] Date of Patent: Mar. 6, 1990

[54] DERAILLEUR GUARD

[75] Inventor: Robert Alan, Mendon, Ohio

[73] Assignee: Huffy Corporation, Dayton, Ohio

[21] Appl. No.: 251,614

[22] Filed: Sep. 29, 1988

[51] Int. Cl.$^4$ ............................................. G05G 25/00
[52] U.S. Cl. ........................................ 74/608; 74/609;
474/144
[58] Field of Search ............... 474/144, 145, 146, 147,
474/80, 82; 280/236; 74/608, 609

[56] References Cited

U.S. PATENT DOCUMENTS

| | | | |
|---|---|---|---|
| 2,108,941 | 2/1938 | Morgan | 474/80 |
| 3,184,993 | 5/1965 | Swenson | 474/144 |
| 3,910,136 | 10/1975 | Juy | 474/144 |
| 3,973,447 | 8/1976 | Nagano | 474/82 |
| 4,135,727 | 1/1979 | Campagnolo | 280/236 |

FOREIGN PATENT DOCUMENTS

| | | | |
|---|---|---|---|
| 309589 | 10/1932 | Italy | 280/236 |
| 5410 | of 1910 | United Kingdom | 474/144 |
| 810243 | 3/1959 | United Kingdom | 474/80 |

Primary Examiner—Gary L. Smith
Assistant Examiner—F. Saether
Attorney, Agent, or Firm—Thompson, Hine and Flory

[57] ABSTRACT

A derailleur guard adapted to be mounted on a bicycle frame and shaped to protect a rear derailleur from impacts from a generally sideward direction. The derailleur guard includes a forward portion shaped to engage a chain stay of a bicycle frame, a rearward portion shaped to engage a dropout attached to the chain stay, and a loop portion extending between the forward and rearward portions and shaped to extend sidewardly from the frame about a rear derailleur mounted on the dropout of the frame.

2 Claims, 2 Drawing Sheets

DERAILLEUR GUARD

BACKGROUND OF THE INVENTION

The present invention relates to bicycle accessories and, more particularly, to guards for protecting the rear derailleurs of multiple-speed bicycles.

The derailleur speed change system provides a lightweight, easily-operable mechanism for changing speeds on a bicycle. Typically, the derailleur system includes a sprocket with five gears of varying sizes mounted on the rear axle of the bicycle, and a rear derailleur having a set of idler wheels which are sidewardly displaceable to cause the chain extending between the front and rear sprockets to disengage one gear and engage another.

The rear derailleur is mounted on the rear wheel axle and projects sidewardly from the bicycle frame. Consequently, the rear derailleur is susceptible to damage from blows received when the bicycle falls on the side of the derailleur so that the derailleur lands upon the ground or, as frequently happens in a racing situation, the rear derailleur contacts part of an adjacent bicycle. Consequently, there is a need for a guard to prevent damage to the relatively delicate rear derailleur of a bicycle.

Some derailleur guards are already in use. For example, Swenson U.S. Pat. No. 3,184,993 discloses a derailleur guard which comprises a plate shaped to partially enclose a rear derailleur. The derailleur plate is mounted on the rear axle of a bicycle and includes a flange which is attached to the derailleur mechanism itself to prevent rotation of the mechanism relative to the bicycle frame. The derailleur guard includes a reinforcing insert member which is also mounted on the rear axle and spaced between the guard and the rear dropout of the bicycle frame.

A disadvantage with this type of guard is that it is attached directly to the rear axle of the bicycle and the rear derailleur so that removal of the derailleur requires the removal of the derailleur guard first. Furthermore, the force of blows delivered to the derailleur guard are transmitted to the derailleur since the guard is attached to the derailleur.

Similarly, Juy U.S. Pat. No. 3,910,136 discloses a rear derailleur guard which comprises a plate shaped to be attached to the idler wheels of the rear derailleur mechanism. While this plate does afford some protection of the idler wheels, a large portion of the derailleur is exposed and, again, the plate is attached directly to the derailleur so that the force of blows sustained by the guard are transmitted directly to the derailleur. Accordingly, there is a need for a derailleur guard for a rear derailleur of a bicycle which does not transmit blows directly to the rear derailleur of the bicycle and, further, does not complicate the procedure for removing the rear derailleur and rear wheel from the bicycle frame.

SUMMARY OF THE INVENTION

The present invention is a derailleur guard for the rear derailleur of a bicycle which includes a forward portion shaped to engage the chain stay adjacent to the derailleur, a rearward portion shaped to engage the dropout adjacent to the derailleur and a loop portion extending between the forward and rearward portions shaped to extend sidewardly from the frame about the derailleur. Since the derailleur guard is attached to the chain stay and dropout of the bicycle frame, rather than to the derailleur itself, the force of blows sustained by the derailleur guard are transmitted to the bicycle frame and not to the derailleur directly. Consequently, the derailleur guard of the present invention provides improved protection for the rear derailleur over prior art devices in which the derailleur guard is mounted entirely or partially on the derailleur itself.

The loop portion of the derailleur guard of the present invention extends downwardly and sidewardly from the chain stay and toe plate of the bicycle frame so that it extends across the idler wheel portion of the derailleur without obscuring the rear axle nut associated with the derailleur. This enables the rear wheel and rear derailleur to be removed without first having to remove the derailleur guard. This design represents an improvement over prior art devices in which the derailleur guard obscures the rear axle nut and therefore must be removed prior to removing the rear wheel. Consequently, the use of the derailleur guard of the present invention does not increase the time or difficulty required to remove the rear wheel from the bicycle.

Although any acceptable form of attachment of the forward and rearward portions to the frame is within the scope of the invention, in a particularly effective embodiment, the forward portion includes a hook having interior and exterior legs for engaging the interior and exterior surfaces of the chain stay, respectively. The hook also includes a leg which engages the underside of the chain stay to prevent the hook and derailleur guard from pivoting upwardly relative to the frame. The rearward portion includes a flattened flange which is attached to the dropout by a screw. Accordingly, the derailleur guard can be attached to and removed from a bicycle frame quickly and easily.

In a further refinement of the preferred embodiment, the flange is offset from the hook of the forward portion so that, upon attachment of the flange to the dropout, the derailleur guard is caused to pivot about the exterior leg of the hook. This ensures a tight connection between the forward portion and the chain stay, and minimizes vibration of the derailleur guard as the bicycle is being ridden.

Accordingly, it is an object of the present invention to provide a rear derailleur guard which is attachable to the frame of a bicycle rather than to the rear derailleur itself, a derailleur guard which does not complicate the procedure for removing the rear wheel of a bicycle from the frame, and a derailleur guard which, while easily attachable to and removable from a bicycle frame does not vibrate when the bicycle is ridden.

Other objects and advantages of the present invention will be apparent from the following description, the appended claims and the accompanying drawings.

DETAILED DESCRIPTION OF THE PREFERRED EMBODIMENT

Figure 1:
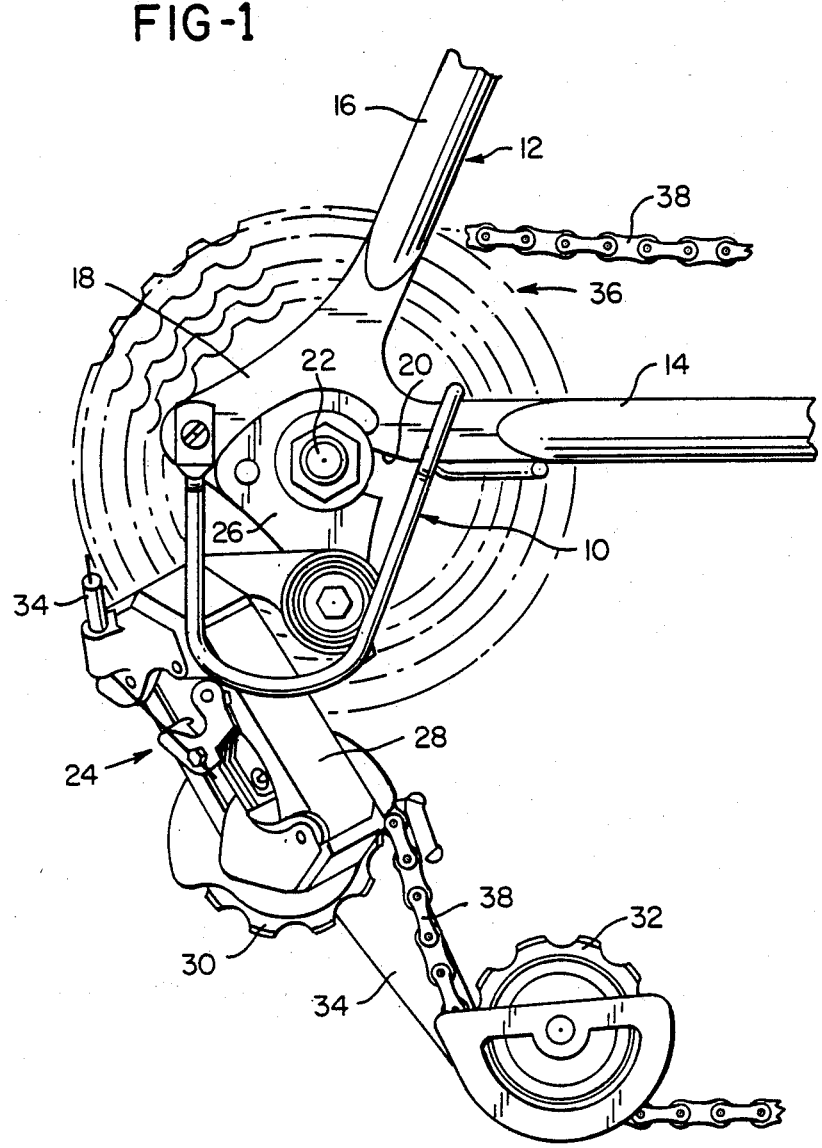
FIG. 1 is a side elevation of the rear portion of a bicycle frame showing a rear derailleur and a preferred embodiment of the derailleur guard of the present invention.

As shown in FIG. 1, the derailleur guard of the present invention, generally designated 10, is made of a mild steel or aluminum and is designed to attach to the frame 12 of a bicycle. The frame 12 includes a generally tubular chain stay 14, a tubular seat stay 16, and a substantially flat dropout 18. The dropout plate 18 (see also FIG. 3) includes a dropout slot 20 which receives the rear axle 22 of a bicycle rear wheel (not shown).

A rear derailleur, generally designated 24, is mounted on the dropout 18. The derailleur 24 includes a mounting plate 26 from which depends a parallelogram linkage 28 which supports first and second idler wheels 30, 32, respectively. Wheel 32 is mounted on a swing arm 34 which is pivotably attached to the linkage 28. The parallelogram linkage 28 is displaceable by a push-pull cable 34 such that the position of idler wheels 30, 32 relative to the frame 12 is adjustable. A rear sprocket, generally designed 36, comprises five sprockets of different size wheels mounted on the rear axle 22 and positioned inboard of the toe plate 18.

Adjustment of the cable 34 causes the idler wheels 30, 32 to align with a predetermined one of the gears of the sprocket 36. A bicycle chain 38 is entrained about the sprocket 36 and idler wheels 30, 32.

Figure 2:
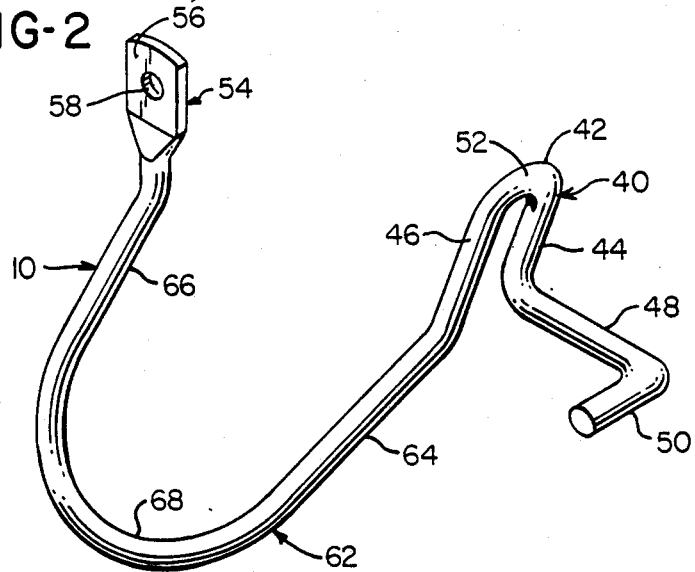
FIG. 2 is a perspective view of the derailleur guard of FIG. 1.
Figure 3:
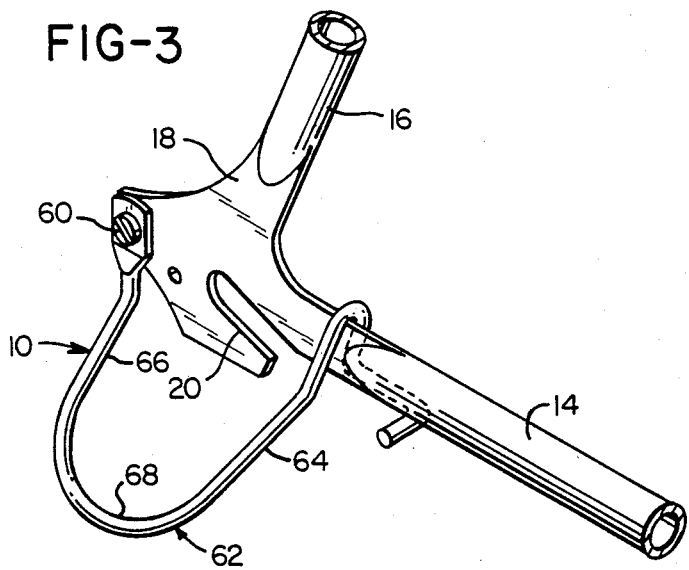
FIG. 3 is a perspective view of the derailleur guard of FIG. 1 shown mounted on a bicycle frame without a derailleur.

As shown in FIGS. 2 and 3, the derailleur guard 10 includes a forward portion 40 shaped to engage the chain stay 14 of the frame 12. The forward portion includes a hook 42 having interior and exterior legs 44, 46, respectively. An angle 48 extends forwardly from the interior leg 44 and includes a stop 50 which is positioned to engage the underside of the chain stay 14. The interior and exterior legs 44, 46 are connected by an elbow 52 which spaces them apart sufficiently to extend about the chain stay 14.

The guard 10 includes a rearward portion 54 which terminates in a flattened flange 56 having a hole 58 therethrough. The hole 58 receives a self-tapping screw 60 which is threaded into the dropout 18.

The guard 10 includes a loop portion, generally designated 62, which extends between the forward and rearward portions 40, 54, respectively. The loop portion includes front and rear linear segments 64, 66, respectively, and an arcuate segment 68 extending between the forward and rearward segments. As shown in the figures, the forward and rearward segments 64, 66 are not parallel.

The forward segment extends downwardly, outwardly and slightly rearwardly from the exterior leg 46 of the forward portion 40. Similarly, the rearward segment extends downwardly and outwardly from the base 70 of the rearward portion 54.

To attach the derailleur guard 10 to the frame 12 of a bicycle, as shown in FIG. 1, the guard is first positioned relative to the frame so that the interior and exterior legs of 44, 46 of the forward portion 40 extend about the chain stay 14 adjacent to the rear derailleur 24. The rearward end 54 is positioned above the dropout 18 and the stop 50 extends below the chain stay 14. The guard 10 is then pivoted about the elbow 52 until the stop 50 contacts the underside of the chain stay 14. The guard 10 is then pivoted about the exterior leg 46 until the flange 56 of the rearward portion 54 is brought into close proximity to the rear portion of the toe plate 18. At this time, the hole 58 is in registry with the corresponding hole (not shown) in the dropout 18 at this location.

The self-tapping screw 60 is inserted through the hole 58, threaded into the hole in the dropout 18, and tightened down on the flange 56. The flange is offset slightly (approximately 0.080 inches in the preferred embodiment) so that by tightening the screw 60 down on the flange 56 to clamp it against the toe plate 18, the guard 10 is caused to pivot slightly about the exterior leg 46 of the forward portion 40 so that the interior and exterior legs 44, 46 of the forward portion are clamped securely against the chain stay 14. This clamping action of the forward portion 40 prevents the derailleur guard 10 from rattling or vibrating as the bicycle to which it is attached is used. The forward portion 40 is secure from further pivoting motion since the chain stay 14 is captured between the elbow 52 and the stop 50.

As shown in FIG. 1, the loop portion 62 extends downwardly and outwardly from the frame 12 to extend about the rear derailleur 24 to protect the parallelogram linkage 28 as well as the idler wheels 30, 32 which are inboard of the parallelogram linkage, should the bicycle frame tip over on that side or should the bicycle graze a vertical object such as a curb or post. The preferred embodiment shown in the figures also protects the derailleur guard from damage or misalignment as a result of receiving a blow during competitive events in which the bicycle on which it is mounted is contacted by another bicycle at that point.

It should be understood that other methods of attachment may be employed without departing from the scope of the invention. For example, the rearward portion 54 may be in the form of a hook similar in construction to that of the forward portion.

While the form of apparatus herein described constitutes a preferred embodiment of the invention, it is to be understood that the invention is not limited to this precise form of apparatus, and that changes may be made therein without departing from the scope of the invention.

What is claimed is:

1. A derailleur guard for use with a bicycle frame having a derailleur mounted on a rear dropout thereof and a claim stay adjacent to said dropout, said derailleur guard comprising:

a forward portion shaped to engage said chain stay, said forward portion including a hook shaped to extend about said chain stay, and having interior and exterior legs for engaging interior and exterior sides of said chain stay, respectively, and an angle, extending from said interior leg, having a stop shaped to engage an underside of said chain stay;

a rearward portion shaped to engage said dropout, said rearward portion including a screw adapted to be threaded into said dropout and flat flange shaped to receive said screw therethrough, said flange being offset from said forward end such that attachment of said rearward end to said dropout causes said guard to pivot about said exterior let relative to said chain stay, whereby said forward portion is caused to bind against said chain stay; and a loop portion extending between said forward and rearward portions shaped to extend downwardly and sidewardly from said frame when said guard is mounted thereon and provide non-contacting clearance between said derailleur and said guard such that, when mounted on said frame, said guard touches only said frame.

2. The guard of claim 1 wherein said hook includes interior and exterior legs for engaging interior and exterior sides of said chain stay, respectively and shaped to extend about said chain stay; and an angle, extending from said interior leg, having a stop shaped to engage an underside of said chain stay, thereby preventing said guard from pivoting upwardly about said rearward portion when said rearward portion is attached to said dropout.

* * * * *

UNITED STATES PATENT AND TRADEMARK OFFICE
CERTIFICATE OF CORRECTION

PATENT NO. : 4,905,541

DATED : March 6, 1990

INVENTOR(S) : Robert Alan

It is certified that error appears in the above-identified patent and that said Letters Patent is hereby corrected as shown below:

Column 4, line 44, please delete "claim" and insert --chain--.

Column 4, line 60, please delete "let" and insert --leg--.

Signed and Sealed this

Seventh Day of April, 1992

Attest:

HARRY F. MANBECK, JR.

*Attesting Officer*   Commissioner of Patents and Trademarks

UNITED STATES PATENT AND TRADEMARK OFFICE
CERTIFICATE OF CORRECTION

PATENT NO. : 4,905,541

DATED : March 6, 1990

INVENTOR(S) : Robert A. Hinschlager

It is certified that error appears in the above-identified patent and that said Letters Patent is hereby corrected as shown below:

Title page, item [75], "Robert Alan" should read
--Robert Alan Hinschlager--.

Signed and Sealed this

Thirteenth Day of July, 1993

Attest:

MICHAEL K. KIRK

Attesting Officer

Acting Commissioner of Patents and Trademarks